US012590701B2

(12) United States Patent
Bertler et al.

(10) Patent No.: US 12,590,701 B2
(45) Date of Patent: Mar. 31, 2026

(54) PASS-THROUGH DEVICE FOR A CHIMNEY

(71) Applicant: Jeremias Inc., Marietta, GA (US)

(72) Inventors: Matthew Bertler, Marietta, GA (US); Clark E. Pridemore, Woodstock, GA (US); Francois Sauve, Marietta, GA (US)

(73) Assignee: Jeremias Inc., Marietta, GA (US)

( * ) Notice: Subject to any disclaimer, the term of this patent is extended or adjusted under 35 U.S.C. 154(b) by 572 days.

(21) Appl. No.: 18/085,339

(22) Filed: Dec. 20, 2022

(65) Prior Publication Data

US 2024/0200776 A1 Jun. 20, 2024

(51) Int. Cl.
*F23J 13/04* (2006.01)
*E04F 17/02* (2006.01)
*E04H 12/28* (2006.01)
*F23J 13/02* (2006.01)
*F27D 17/30* (2025.01)

(52) U.S. Cl.
CPC ............ *F23J 13/025* (2013.01); *E04H 12/28* (2013.01); *F27D 17/302* (2025.01); *E04F 17/026* (2013.01)

(58) Field of Classification Search
CPC ................................. F23J 13/04; F23J 13/025
USPC ............................... 126/317, 318; 285/123.3
See application file for complete search history.

(56) References Cited

U.S. PATENT DOCUMENTS 145,579 A * 12/1873 Linden .................... F23J 13/04 126/314
2,056,840 A 10/1936 Collom
3,226,135 A * 12/1965 Epstein .................... F16L 9/18 138/112
3,286,015 A 11/1966 Hildebrand et al.
3,711,050 A 1/1973 Case
4,607,665 A * 8/1986 Williams ................ F23J 13/04 138/108
4,896,701 A 1/1990 Young
5,303,744 A 4/1994 Eriksson
5,803,127 A 9/1998 Rains
6,113,155 A * 9/2000 Beirens .................. F16L 21/08 285/47
6,158,475 A 12/2000 Clemmer
6,186,452 B1 2/2001 Zearbaugh et al.
6,896,004 B1 5/2005 Witzel
(Continued)

FOREIGN PATENT DOCUMENTS

CN 110748705 2/2020
CN 110748705 A * 2/2020 ........... F16L 3/1091
(Continued)

OTHER PUBLICATIONS

Dobrasauna Komin Set 115mm NPL, screenshots from Wayback machine dated to May 2022, as well as supporting images (Year: 2025).*
(Continued)

*Primary Examiner* — Kenneth Rinehart
*Assistant Examiner* — Haotian Lu
(74) *Attorney, Agent, or Firm* — Arnall Golden Gregory LLP

(57) ABSTRACT

A pass-through device for a chimney, and a chimney support system having pass-through device for a chimney, are provided. The pass-through device includes a pass-through tube and a chimney support disposed within the pass-through tube. The chimney support is supported by the pass-through tube from within the pass-through tube.

39 Claims, 9 Drawing Sheets

(56) References Cited

U.S. PATENT DOCUMENTS

| | | | | |
|---|---|---|---|---|
| 8,453,680 | B2 | 6/2013 | Weiss et al. | |
| 2002/0092518 | A1* | 7/2002 | Maiello | F23J 13/04 126/318 |
| 2010/0021795 | A1 | 1/2010 | Takeshita et al. | |
| 2013/0168129 | A1 | 7/2013 | Cox et al. | |
| 2016/0215978 | A1 | 7/2016 | Bertler et al. | |
| 2017/0207615 | A1 | 7/2017 | Trapassi et al. | |
| 2022/0090710 | A1 | 3/2022 | Rohskopf et al. | |
| 2022/0322578 | A1 | 10/2022 | Geng et al. | |

FOREIGN PATENT DOCUMENTS

| | | | | |
|---|---|---|---|---|
| CN | 210624651 | | 5/2020 | |
| NL | 9000096 | A * | 8/1991 | F23J 13/025 |
| NL | 1003485 | C2 * | 1/1998 | F23J 13/025 |
| WO | WO 2022/061036 | | 3/2022 | |

OTHER PUBLICATIONS

U.S. Appl. No. 63/081,099, filed Sep. 21, 2020, Larry Roshkopf et al.

International Search Report and Written Opinion issued in PCT/US2021/050745, mailed Dec. 22, 2021.

* cited by examiner

PASS-THROUGH DEVICE FOR A CHIMNEY

FIELD OF THE INVENTION

Embodiments disclosed herein are directed to a pass-through device for a chimney, and a chimney system having a pass-through device, and more particularly, to a pass-through device having a chimney support that is disposed within a pass-through tube and supported entirely from within the pass-through tube, and more particularly, to a universal pass-through device configured for vertical, horizontal, and other pass-through installation configurations.

BACKGROUND

A chimney assembly, such as a residential or commercial chimney assembly, may include a pass-through device configured to penetrate through a building structure, such as a wall, roof, etc., and to isolate a chimney pipe from the building structure by a desirable amount. Conventional pass-through devices may be configured for specific installation configurations depending on the particular building structure being passed-through, a direction of the pass-through, such as a horizontal pass-through, vertical pass-through, or other installation configuration.

SUMMARY OF THE INVENTION

The embodiments disclosed herein address problems associated with conventional pass-through devices, which provide load bearing support for a chimney assembly on an upstream side (e.g., interior side) of a building structure, such as at the bottom of the chimney assembly penetrating through a roof or ceiling, or at the upstream end of the chimney penetrating through a wall, using a load-bearing pass-through end cap, which complicates assembly, maintenance, and/or inspection of the chimney assembly. The present embodiments further recognize that such conventional pass-through devices may require a variety of parts and configurations depending on the type of installation configuration, such as a horizontal, vertical, or angled installation configuration, reduced clearance configuration, insulated configuration, etc., and/or depending on the particular building structure being passed-through by the pass-through device, such as a roof, ceiling, wall, etc.

These problems, and others, are addressed by the embodiments as described herein, a first exemplary embodiment of which may comprise a pass-through device for a chimney, the pass-through device comprising a pass-through tube, and a chimney support disposed within the pass-through tube, wherein the chimney support is supported by the pass-through tube from within the pass-through tube.

The present embodiments can minimize or eliminate a need for a load-bearing support for a chimney assembly on an upstream side (e.g., interior side) of a building structure, such as at the bottom of the chimney assembly penetrating through a roof, ceiling, attic, etc., or at the upstream end of the chimney penetrating through a wall, using a load-bearing pass-through end cap, which may simplify assembly, maintenance, and/or inspection of the chimney assembly. The present embodiments can provide a universal pass-through device for a chimney, thereby minimizing or eliminating a need for a variety of individualized parts and configurations depending on the type of installation configuration, such as a horizontal, vertical, or angled installation configuration, reduced clearance configuration, insulated configuration, etc., or depending on the particular building structure being passed-through by the pass-through device, such as a roof, ceiling, attic structure, wall, etc. As a result, the present embodiments can minimize or reduce manufacturing costs, parts and inventory storage costs, transportation, and freight costs, among other advantages previously unachievable with systems of the prior art.

In some examples, a chimney support may be supported entirely from within a pass-through tube. In a preferred example, a pass-through tube can comprise an inward interference bead projecting radially inward from an interior surface of the pass-through tube, wherein a chimney support comprises a chimney support plate, and wherein the chimney support plate can be supported by the inward interference bead of the pass-through tube. In another example, an inward interference bead can project radially inward from the interior surface of the pass-through tube by a predetermined depth such that a chimney support plate can interface with the inward interference bead of the pass-through tube and can restrict movement of the chimney support within the pass-through tube.

In some examples, such as a vertical installation configuration or angled installation, a chimney support may be supported by a chimney support plate bearing on an inward interference bead of the pass-through tube owing at least in part to gravity or owing entirely to gravity. In other examples, such as a horizontal installation configuration, angled installation, etc., a chimney support can be at least partially supported by interference between the chimney support plate and the inward interference bead of the pass-through tube or entirely supported by interference between the chimney support plate and the inward interference bead of the pass-through tube.

In some examples, an outer diameter of a chimney support plate can substantially correspond to an interior diameter of a pass-through tube. In another example, an inward interference bead may define a clearance distance at a predetermined location along a length of the pass-through tube, the clearance distance being less than an interior diameter of the pass-through tube in other regions, and wherein an outer diameter of the chimney support plate is greater than the clearance distance. In an example, the inward interference bead may define an opening within the pass-through tube, and wherein an outer diameter of the chimney support plate is greater than an inner diameter of the opening defined by the inward interference bead.

In some examples, an inward interference bead can project radially inward from an interior surface of a pass-through tube continuously around a circumference of the interior surface of the pass-through tube. In other examples, the inward interference bead may include a plurality of bead sections projecting radially inward from the interior surface of the pass-through tube around a circumference of the interior surface of the pass-through tube. In still other examples, the inward interference bead can include a plurality of bead sections projecting radially inward from the interior surface of the pass-through tube intermittently around a circumference of the interior surface of the pass-through tube. In some examples, the inward interference bead may project radially inward from the interior surface of the pass-through tube without extending continuously around a circumference of the interior surface of the pass-through tube.

In an example, an inward interference bead may be disposed in a middle portion along a length of the pass-through tube. In other examples, the inward interference bead may be spaced a predetermined distance from an end of the pass-through tube. In an example, the predetermined distance may be equal to or less than about ⅔ of a length of the pass-through tube.

In an example, a predetermined depth of an inward interference bead can be less than or equal to about 2 inches. In another example, the predetermined depth of the inward interference bead may be equal to or greater than about 0.25 inches and less than or equal to about 2 inches. In a particular example, a diameter of a pass-through tube may be less than or equal to about 18 inches, and the predetermined depth of the inward interference bead can be equal to or greater than about 0.25 inches and less than or equal to about 2 inches.

In an example, a pass-through device may further comprise a connector pipe adapter coupled to an end of a chimney support, wherein an end portion of the connector pipe adapter extends outward from an end of the pass-through tube, and wherein a location of an inward interference bead along a length of the pass-through tube determines a distance that the end portion of the connector pipe adapter extends from the end of the pass-through tube.

In another example, a pass-through device may further comprise a pass-through end cap disposed on an end of the pass-through tube, wherein the pass-through end cap is non-load bearing.

In still another example, a pass-through device can further comprise a connector pipe adapter coupled to an end of a chimney support, and a pass-through end cap disposed on an end of the pass-through tube, wherein a portion of the connector pipe adapter extends through an opening in the pass-through end cap, and wherein the pass-through end cap does not bear a load from the chimney support and does not bear a load from the connector pipe adapter.

Another exemplary embodiment may comprise a chimney support system comprising a pass-through tube having at least a portion configured to penetrate through a building structure, a chimney support disposed within the pass-through tube and supported by the pass-through tube from within the pass-through tube, the chimney support having a first end configured to be coupled to one of an end of a chimney pipe and an end of a chimney pipe component.

In an example, a pass-through tube can comprise an inward interference bead projecting radially inward from an interior surface of the pass-through tube, wherein a chimney support comprises a chimney support plate, and wherein the chimney support plate is supported by the inward interference bead of the pass-through tube.

In another example, a chimney support system may further comprise a connector pipe adapter including a first end coupled to a second end of the chimney support system within the pass-through tube, and a second end extending outward from an end of the pass-through tube and configured to be disposed on an opposite side of a building structure from a chimney pipe, wherein a location of an inward interference bead along a length of the pass-through tube determines a distance that the second end of the connector pipe adapter extends from the end of the pass-through tube.

In another example, a chimney support system may further comprise a pass-through end cap disposed on an end of a pass-through tube, the pass-through end cap configured to be disposed on an opposite side of a building structure from a chimney pipe, wherein the pass-through end cap is non-load bearing.

In another example, a chimney support system may further comprise a pass-through end cap disposed on an end of a pass-through tube, the pass-through end cap configured to be disposed on an opposite side of a building structure from a chimney pipe, wherein the pass-through end cap does not bear a load from the chimney support and does not bear a load from a connector pipe adapter.

In still another example, a chimney support system may further comprise a mount bracket configured to secure a position of a pass-through tube with respect to a building structure.

Another exemplary embodiment may comprise a pass-through device for a chimney, the pass-through device comprising a pass-through tube having at least a portion configured to penetrate through a building structure, a chimney support configured to be coupled to one of an end of a chimney pipe and an end of a chimney pipe component and means for supporting the chimney support within the pass-through tube.

As explained, the exemplary embodiments can minimize or eliminate a need for a load bearing support for a chimney assembly on an upstream side (e.g., interior side) of a building structure, such as at a bottom of the chimney assembly penetrating through a roof, ceiling, attic, etc., or at an upstream end of the chimney penetrating through a wall, using a load-bearing pass-through end cap, which may simplify assembly, maintenance, and/or inspection of the chimney assembly.

Moreover, embodiments described herein can minimize or eliminate a need to provide fasteners to support a chimney support to a pass-through tube. For example, the assembly and support of the chimney support to a pass-through tube may be facilitated by a chimney support plate of the chimney support and an inward interference bead of the pass-through tube that can transmit vertical chimney load or other chimney load to the pass-through tube, without fasteners, via the chimney support (e.g., a separate universal chimney support).

By providing a chimney support for a chimney tube and supporting the chimney support via a pass-through tube from within the pass-through tube, embodiments described herein can provide an open-ended configuration at an upstream end of a chimney assembly penetrating through a building structure, such that a non-load bearing end cap can be utilized and installed on-site, thereby simplifying on-site installation.

The examples of an assembly of a chimney support and pass-through tube, for example, a chimney support plate of the chimney support and an inward interference bead of the pass-through tube, can be universally used for various configurations, such as vertical or horizontal installations, as well as for various applications, such as a firestop radiation shield application, an attic insulation shield application, roof installation, tee installation, etc., and can provide unitized construction (inner to outer wall) with a support plate, and/or can enable support in a secondary "re-support" application.

The examples of an assembly of a chimney support and pass-through tube, for example, a chimney support plate of the chimney support and an inward interference bead of the pass-through tube, can be used to dictate a proper installation depth of a chimney system for various configurations, such as vertical or horizontal installations, as well as for various applications. Examples of the assembly of the chimney support and pass-through tube can ensure proper clearances to combustible material within a building structure, such as a wall in a horizontal installation. Furthermore, by enabling the use of a non-load bearing end cap, exemplary embodiments described herein can provide and improve access through the pass-through tube to facilitate installation. Moreover, the pass-through tube can thereby be easily and efficiently disassembled after installation, for example, for inspection and/or cleaning, etc.

As explained, according to exemplary embodiments disclosed herein, the present invention can provide a universal pass-through device for a chimney that is capable of being used in a variety of types of installation configurations, such as horizontal, vertical, or angled installation configurations, reduced clearance configurations, insulated configurations, etc., and/or in a variety of types of building structures, such as roofs, ceilings, walls, etc., thereby minimizing or eliminating a need for a variety of individualized parts and configurations, as well as minimizing or reducing manufacturing costs, parts and inventory storage costs, transportation and freight costs, among other things. Additionally, the present embodiments may reduce complexity of a chimney system and simplify procurement and ordering for customers, installers, etc., and may do so by consolidating to a single SKU (stock keeping unit) for a plurality of installation applications or all installation applications.

Furthermore, the exemplary embodiments disclosed herein can enable a nested configuration of components of a chimney support system, thereby allowing for a more efficient and compact storage and/or packaging of the components, which can minimize or reduce the burden, costs, and logistic requirements associated with, for example, storage of parts and/or inventory, distribution and/or freight of the components and/or assembly, etc.

Other features and advantages of the present invention will become apparent to those skilled in the art upon review of the following detailed description and drawings.

BRIEF DESCRIPTION OF THE DRAWINGS

These and other aspects and features of embodiments of the present invention will be understood by the skilled artisan after a reading of the following detailed description, together with the attached drawings, wherein.

DETAILED DESCRIPTION

Figure 1A:
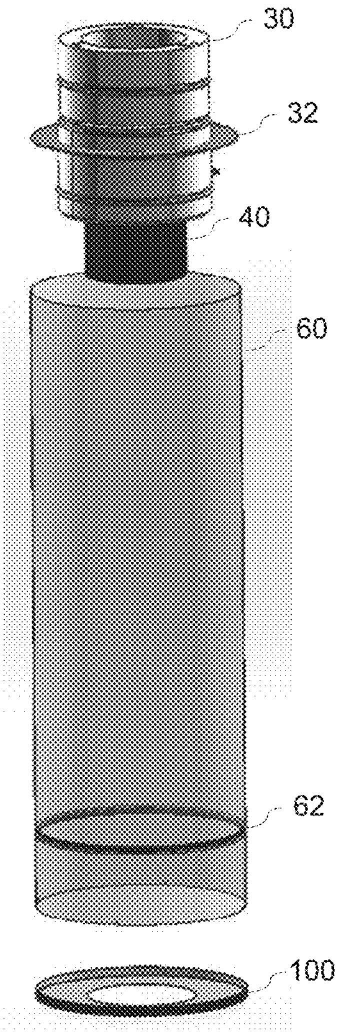
FIG. 1A is an exploded perspective view of a pass-through device for a chimney, according to one or more exemplary embodiments of the disclosure.

Embodiments of the disclosure are described more fully hereinafter with reference to the accompanying drawings. The embodiments disclosed herein may encompass many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-12 illustrate exemplary embodiments of a pass-through device for a chimney, and a chimney support system having pass-through device for a chimney.

Figure 1B:
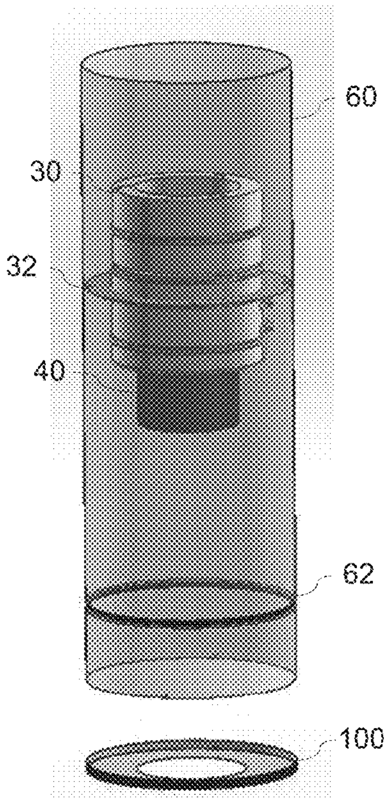
FIG. 1B is partially assembled perspective view of a pass-through device for a chimney, according to one or more exemplary embodiments of the disclosure.
Figure 1C:
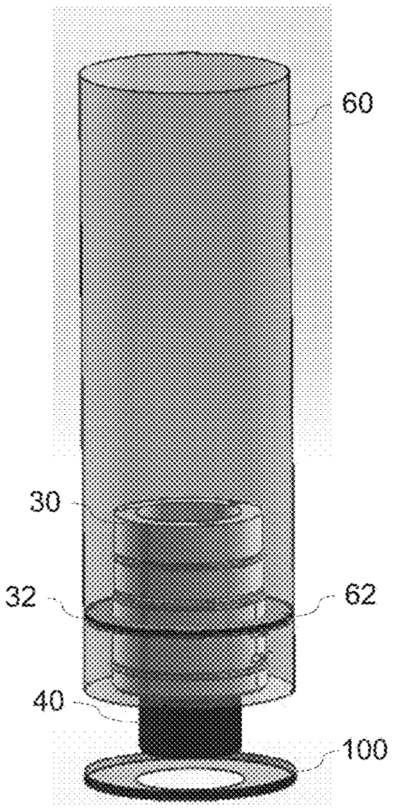
FIG. 1C is another partially assembled perspective view of a pass-through device for a chimney, according to one or more exemplary embodiments of the disclosure.

With reference to FIGS. 1A-1C, examples of a pass-through device for a chimney will first be described. The pass-through device can include a pass-through tube 60 and a chimney support 30 disposed within the pass-through tube. The chimney support 30 can be supported by the pass-through tube 60 from within the pass-through tube 60 and may be supported entirely from within the pass-through tube 60.

In the illustrated example of FIGS. 1A-1C, the pass-through tube 60 can include an inward interference bead 62 projecting radially inward from an interior surface of the pass-through tube 60. The chimney support 30 can include a chimney support plate 32. The chimney support plate 32 is supported, for example, by the inward interference bead 62 of the pass-through tube 60. The pass-through device can optionally include a non-load bearing pass-through end cap 100 disposed on an end of the pass-through tube 60. That is, the pass-through end cap 100 does not bear a load from the chimney support 30 nor a load from the connector pipe adapter 40.

Figure 2A:
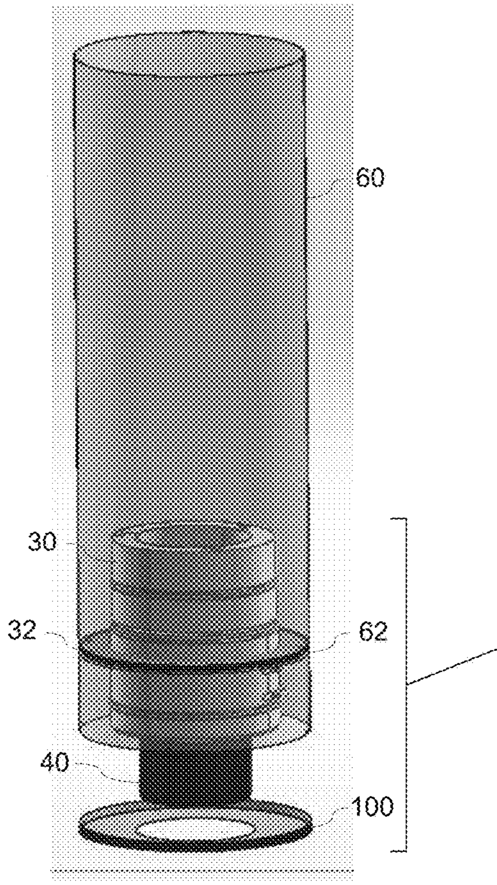
FIG. 2A is a perspective view of a pass-through device for a chimney, according to one or more exemplary embodiments of the disclosure.
Figure 2B:
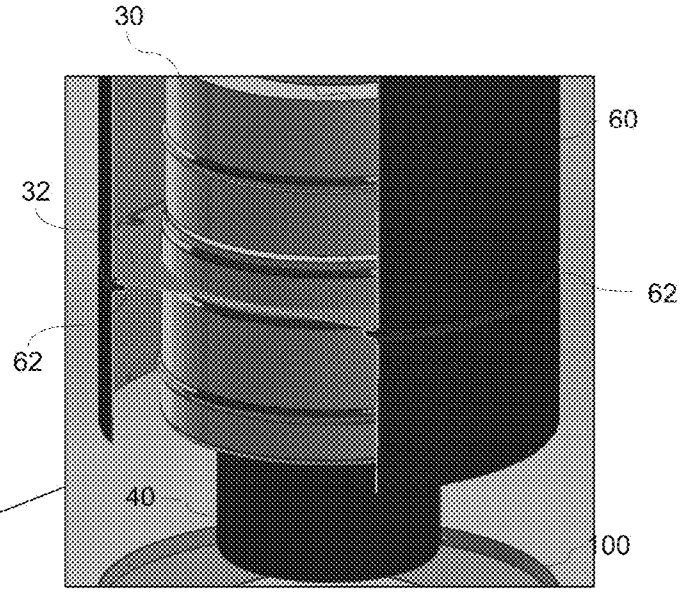
FIG. 2B is an enlarged cutaway view of FIG. 2A, according to one or more exemplary embodiments of the disclosure.

With reference to FIGS. 2A-2B, the inward interference bead 62 can project radially inward from the interior surface of the pass-through tube 60 by a predetermined depth such that the chimney support plate 32 interfaces with the inward interference bead 62 of the pass-through tube 60 and restricts movement of the chimney support 30 within the pass-through tube 60. In a vertical installation configuration, as shown for example in FIGS. 1A-2B, the chimney support 30 can be supported by the chimney support plate 32 bearing on the inward interference bead 62 of the pass-through tube 60 owing at least in part to gravity or owing entirely to gravity. In a horizontal installation configuration, as will be described in greater detail with reference to FIGS. 5-6, the chimney support 30 can be at least partially supported by interference between the chimney support plate 32 and the inward interference bead 62 of the pass-through tube 60, or entirely supported by interference between the chimney support plate 32 and the inward interference bead 62 of the pass-through tube 60.

With reference again to FIGS. 2A-2B, an outer diameter of the chimney support plate 32 can substantially correspond to an interior diameter of the pass-through tube 60. In other examples, an outer diameter of the chimney support plate 32 can be less than an interior diameter of the pass-through tube 60 provided the support plate 62 can be supported by the inward interference bead 62.

The inward interference bead 62 can define a clearance distance at a predetermined location along a length of the pass-through tube 60. The clearance distance can be less than an interior diameter of the pass-through tube 60 in other regions. The outer diameter of the chimney support plate 32 can be greater than the clearance distance. In other examples, the inward interference bead 62 can define an opening within the pass-through tube 60. The outer diameter of the chimney support plate 32 can be greater than an inner diameter of the opening defined by the inward interference bead 62.

Figure 8:
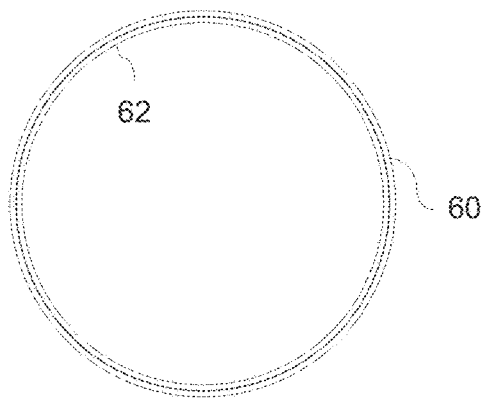
FIG. 8 is an end view of a pass-through tube for a chimney with an inward interference bead projecting radially inward from an interior surface of the pass-through tube continuously around a circumference of the interior surface of the pass-through tube, according to one or more exemplary embodiments of the disclosure.
Figure 9:
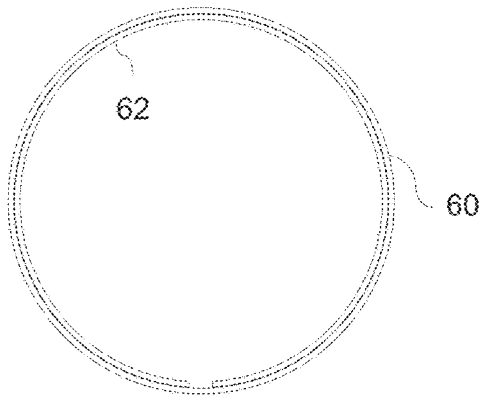
FIG. 9 is an end view of a pass-through tube for a chimney with an inward interference bead projecting radially inward from an interior surface of the pass-through tube non-continuously around a circumference of the interior surface of the pass-through tube, according to one or more exemplary embodiments of the disclosure.
Figure 10:
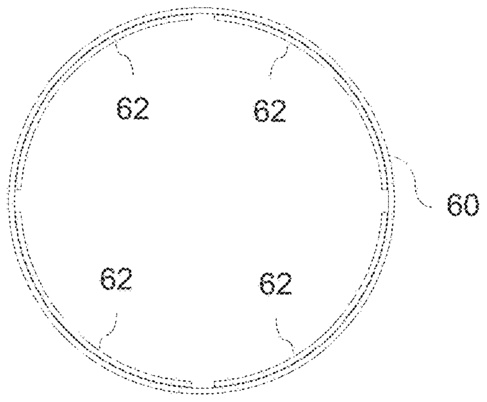
FIG. 10 is an end view of a pass-through tube for a chimney with a plurality of interference bead sections projecting radially inward from an interior surface of the pass-through tube around a circumference of the interior surface of the pass-through tube, according to one or more exemplary embodiments of the disclosure.

With reference to FIG. 8, the inward interference bead 62 can project radially inward from the interior surface of the pass-through tube 60 continuously around a circumference of the interior surface of the pass-through tube 60. In other instances, and as shown in FIG. 9, the inward interference bead 62 can project radially inward from the interior surface of the pass-through tube 60 without extending continuously around a circumference of the interior surface of the pass-through tube 60. In other instances, and as shown in FIG. 10, the inward interference bead 62 can include a plurality of bead sections projecting radially inward from the interior surface of the pass-through tube 60 around a circumference of the interior surface of the pass-through tube 60. In still other examples, the inward interference bead 62 can include a plurality of bead sections projecting radially inward from the interior surface of the pass-through tube 60 intermittently around a circumference of the interior surface of the pass-through tube 60.

With reference again to FIGS. 1A-2B, the inward interference bead 62 can be disposed in a middle portion along a length of the pass-through tube 60. The inward interference bead 62 can be spaced a predetermined distance from an end of the pass-through tube 60. In an example, the predetermined distance can be equal to or less than about ⅔ of a length of the pass-through tube 60.

Figure 11:
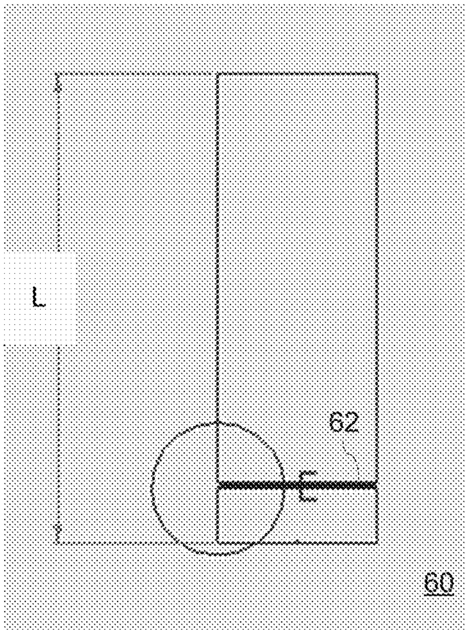
FIG. 11 is a side view of a pass-through tube for a chimney, according to one or more exemplary embodiments of the disclosure.
Figure 12:
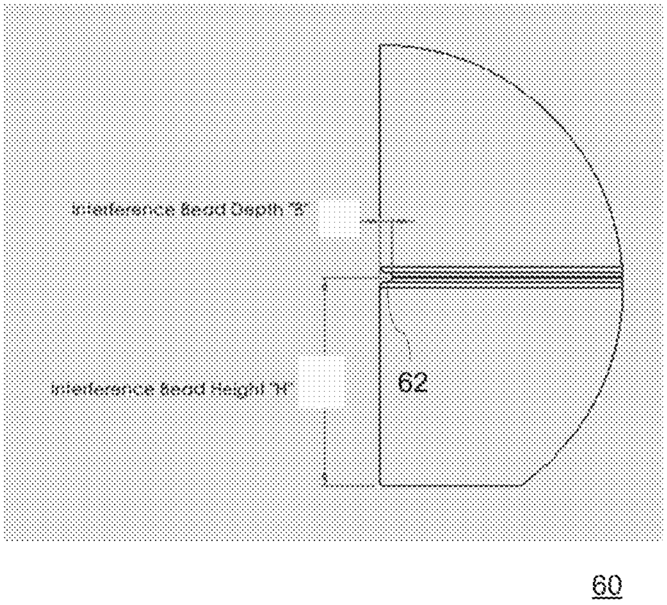
FIG. 12 is a partial section view of the pass-through tube of FIG. 11.

Referring to a particular example illustrated in FIGS. 11-12, a predetermined depth of the inward interference bead 62 can be less than or equal to about 2 inches. In another example, a predetermined depth of the inward interference bead 62 can be equal to or greater than about 0.25 inches and less than or equal to about 2 inches. In a particular example, a diameter of the pass-through tube 60 can be less than or equal to about 18 inches, and a predetermined depth of the inward interference bead 62 can be equal to or greater than about 0.25 inches and less than or equal to about 2 inches.

Other configurations are possible within the spirit and scope of the present disclosure. For example, a chimney support plate 32 can be integrally formed on or coupled to the chimney support 30. The inward interference bead 62 can be integrally formed with the pass-through tube 60, for example, by stamping, pressing, crimping, rolling, etc. a part of the wall of the pass-through tube 60. In other examples, the inward interference bead 62 can be separately formed and coupled to the pass-through tube 60. In another example, another part of the chimney support 30 can be supported by bearing on the inward interference bead 62 of the pass-through tube 60.

Figure 3:
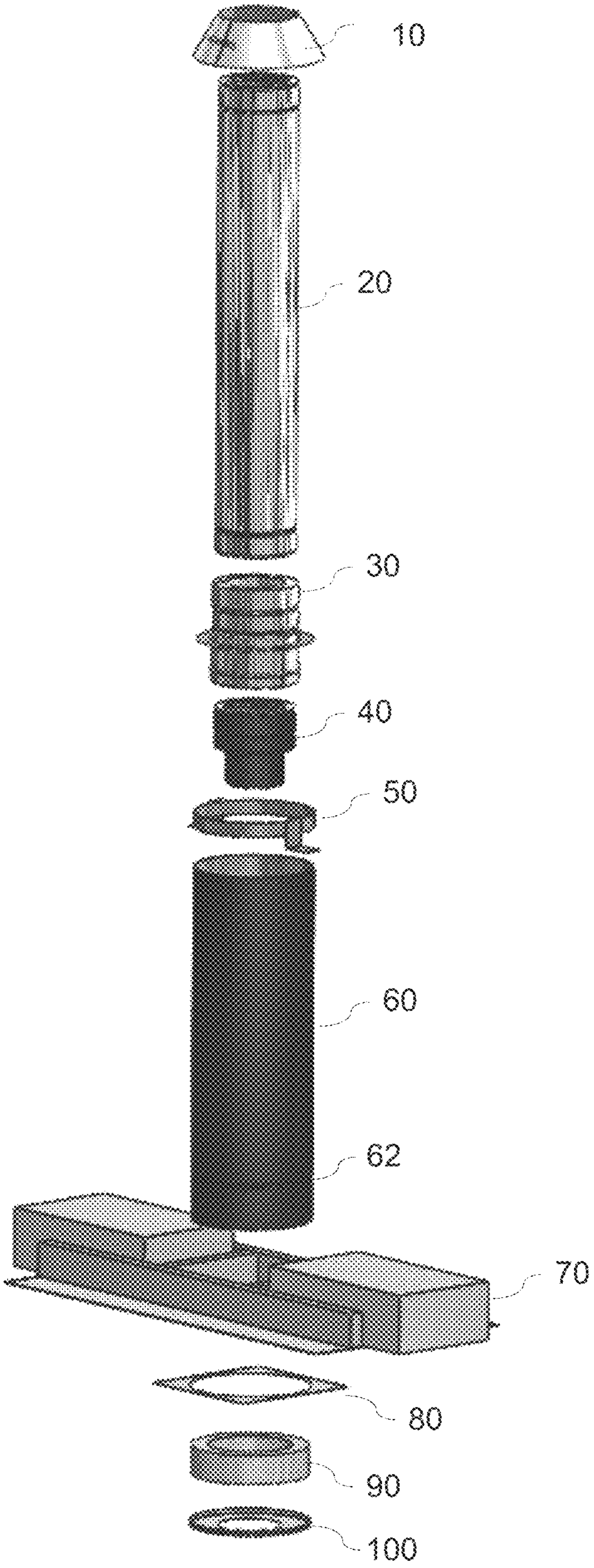
FIG. 3 is an exploded view of a chimney having a chimney support system, according to one or more exemplary embodiments of the disclosure.

With reference to FIG. 3, an example of a vertical configuration of a chimney having an exemplary chimney support system, will now be described.

The illustrated vertical configuration can include, for example, an attic insulation shield collar 10, a chimney pipe 20, a chimney support 30 having chimney support plate, a connector pipe adapter 40, a pass-through mount bracket 50, a pass-through tube 60 having inward interference bead 62. FIG. 3 illustrates an example of a building structure 70, such as existing structure having joists, insulation, etc. Other building structures and applications are contemplated, and would readily be envisaged by those skilled in the art. The illustrated vertical configuration can further include, for example, one or more of a pass-through tube trim plate 80, a pass-through tube insulation 90, and a pass-through tube end cap (non-load bearing) 100. Other vertical configurations and combinations of these and/or other elements are possible.

Figure 4A:
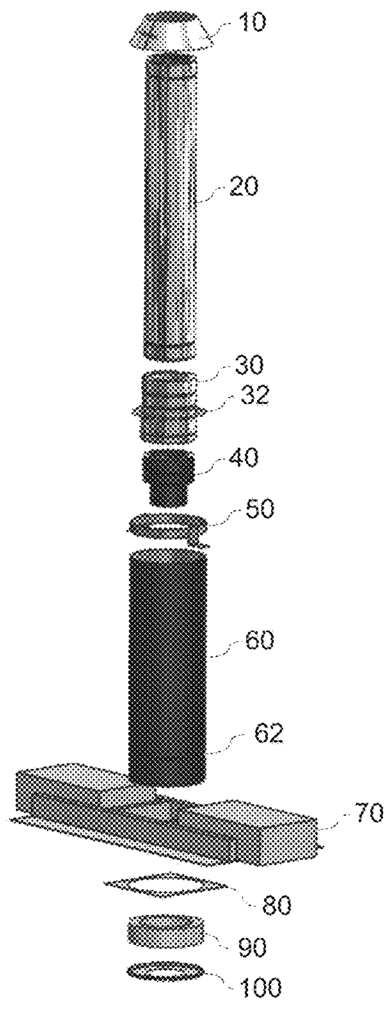
FIGS. 4A-4C illustrate an assembly process of a vertical pass-through chimney having a chimney support system, according to one or more exemplary embodiments of the disclosure.
Figure 4B:
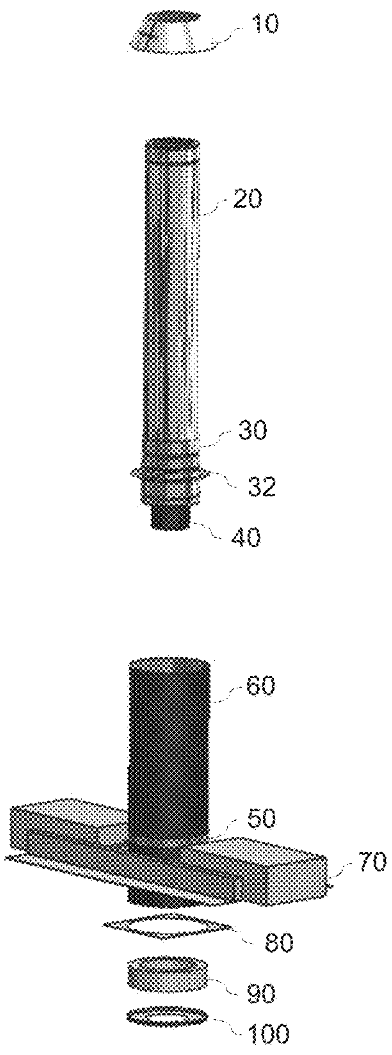
Figure 4C:
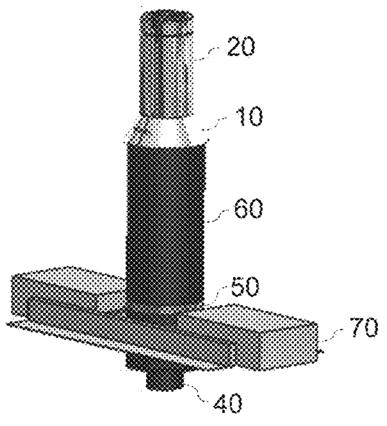

With reference to FIGS. 4A-4C, an example of an assembly process for assembling the example arrangement of FIG. 3 will now be described.

FIG. 4A shows an exploded view of the example arrangement of FIG. 3. As shown in FIG. 4B, the connector pipe adapter 40 can be coupled to one end (i.e., an upstream end) of the chimney support 30. The chimney pipe 20 can be coupled to the other end (i.e., the downstream end) of the chimney support 30.

An end of the pass-through tube 60 can be inserted through (e.g., penetrate through) an opening in the building structure 70. The mount bracket 50 can be used to secure the pass-through tube 60 to the building structure 70 at an appropriate position of a particular arrangement, configuration, and/or application. As shown in FIG. 4C, after assembly onto the building structure, an end portion of the connector pipe adapter 40 can extend outward from an end of the pass-through tube 60. A location of the inward interference bead 62 along a length of the pass-through tube 60 can determine a distance that the end portion of the connector pipe adapter 40 extends from the end of the pass-through tube 60.

On the other side (e.g., interior side or upstream side) of the building structure, one or more of the pass-through tube trim plate 80, pass-through tube insulation 90, and pass-through tube end cap (non-load bearing) 100 can be assembled onto the building structure 70 and/or the end of the pass-through tube 60.

The assembly of the chimney support 30, the connector pipe adapter 40, and the chimney pipe 20 can then be inserted into the pass-through tube 60 such that the chimney support 30, along with the other components coupled thereto, is supported by the pass-through tube 60 from within the pass-through tube 60. In the illustrated example, the pass-through tube 60 can include an inward interference bead 62 projecting radially inward from an interior surface of the pass-through tube 60. The chimney support 30 can include a chimney support plate 32, and wherein the chimney support plate 32 is supported (e.g., entirely supported) by the inward interference bead 62 of the pass-through tube 60 owing to gravity and/or interference between the bead 62 and the plate 32. The order of the assembly process is not limited to the illustrated example, and can be modified depending on the particular application, installation, etc.

Figure 5:
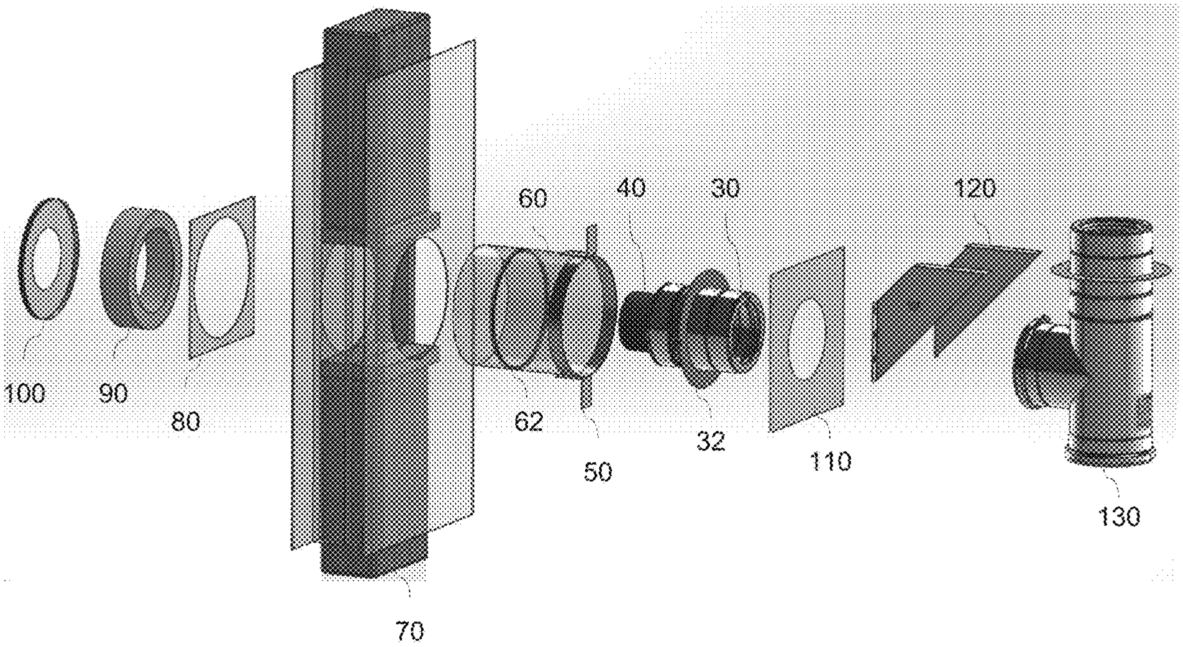
FIG. 5 is an exploded view of a horizontal pass-through chimney having a chimney support system, according to one or more exemplary embodiments of the disclosure.
Figure 6:
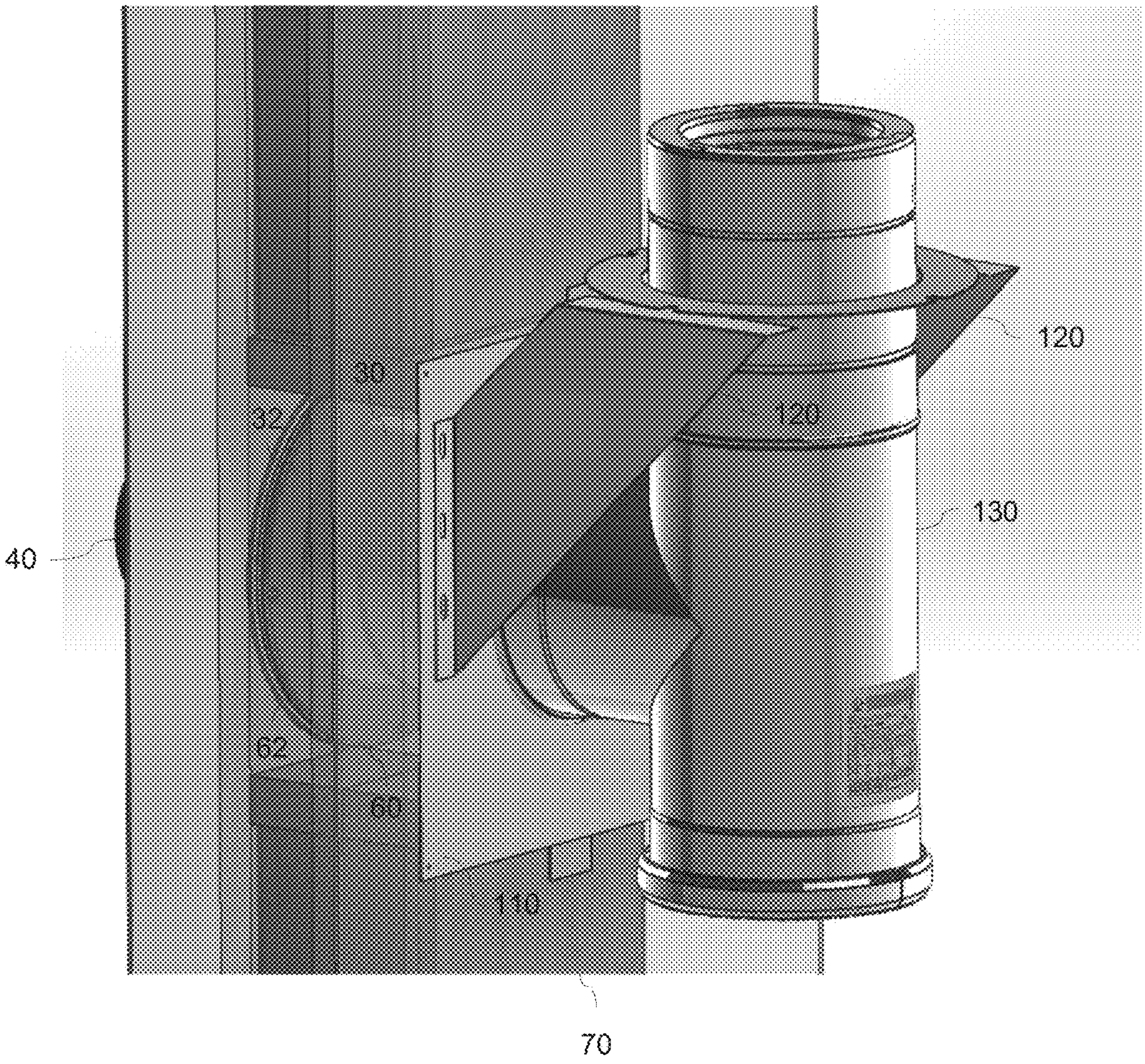
FIG. 6 is an assembled perspective view of a horizontal pass-through chimney having a chimney support system, according to one or more exemplary embodiments of the disclosure.

With reference to FIGS. 5-6, an example of a horizontal configuration of a chimney having an exemplary chimney support system, will now be described.

The illustrated horizontal configuration can include, for example (from right to left), a tee 130 for a chimney (e.g., including a chimney support therein, such as a chimney support similar to the example illustrated in FIGS. 1A-2B to support a chimney pipe, which is not shown in FIGS. 5-6), a tee support bracket 120, a firestop plate 110, a chimney support 30 having a chimney support plate 32 and a separate or integral connector pipe adapter 40, a mount bracket 50, and a pass-through tube 60 having an inward interference bead 62. The mount bracket 50 can be separately formed from, or integrally formed with, the pass-through tube 60.

FIGS. 5-6 illustrate an example of a building structure 70, such as an existing wall structure. Other building structures and applications are contemplated and would readily be envisaged by those skilled in the art. The illustrated horizontal configuration can further include, for example, one or more of a pass-through tube trim plate 80, a pass-through tube insulation 90, and a pass-through tube end cap (non-load bearing) 100. Other vertical configurations and combinations of these and/or other elements are possible. FIG. 6 illustrates an example of an assembled horizontal configuration having the exemplary elements shown in FIG. 5.

Figure 7:
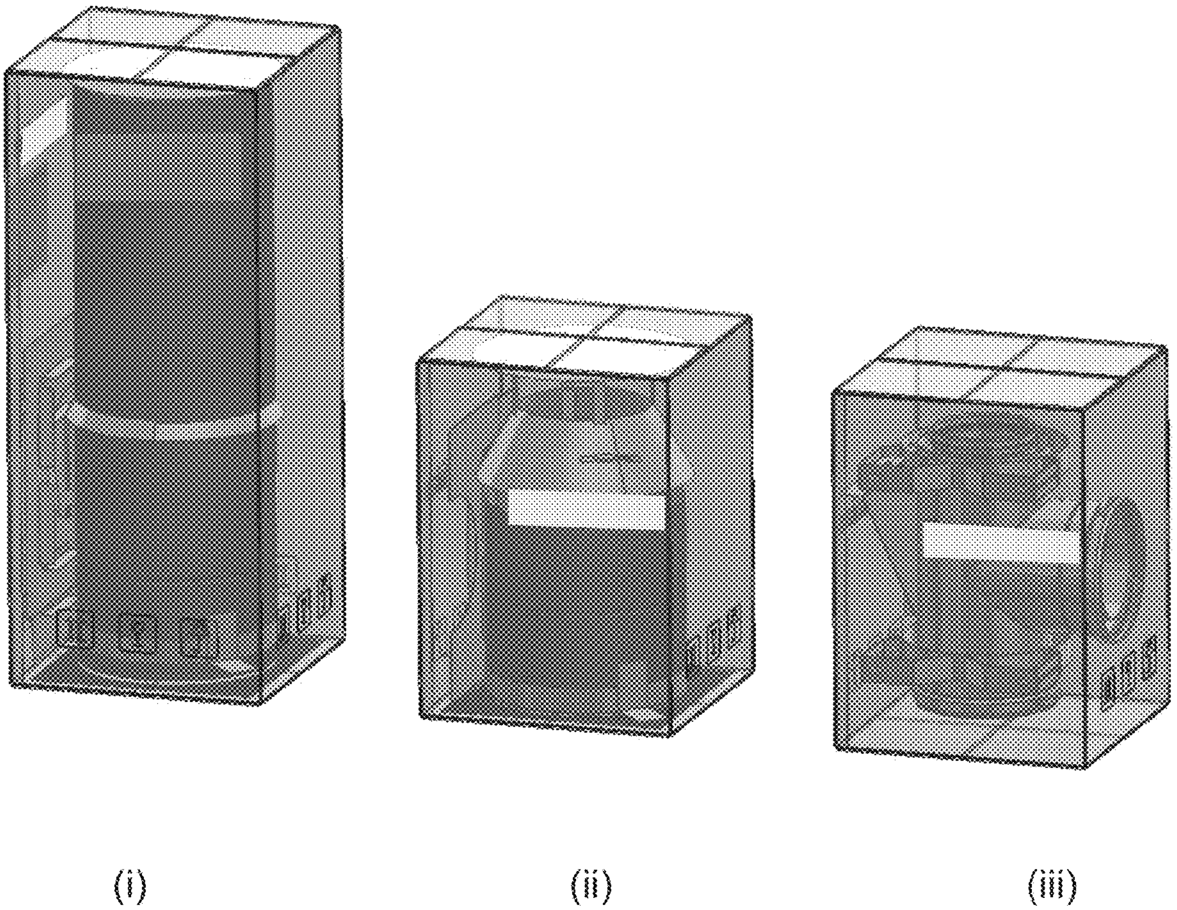
FIG. 7(*i*)-7(*iii*) illustrate nested packaging configurations of a chimney support system, according to one or more exemplary embodiments of the disclosure.

FIG. 7(*i*)-(*iii*) illustrate nested packaging configurations of examples of chimney support systems, according to embodiments described herein. Embodiments of the present disclosure provide the ability to efficiently and with less wasted space package embodiments of the invention thereby allowing for improved packing and supply chain management, which can allow for lower shipping costs and other efficiencies. Further, as shown in FIG. 7(*i*)-(*iii*), embodiments described herein permit a nested configuration that allows for packaging of all components of a chimney support system in a single box.

According to embodiments described herein, a pass-through device can include a pass-through tube (e.g., 60) and a chimney support (e.g., 30) disposed within the pass-through tube. The chimney support (e.g., 30) can be supported by the pass-through tube (e.g., 60) and may be supported entirely from within the pass-through tube (e.g., 60).

According to another exemplary embodiments of the invention, a chimney support system can include a pass-through tube (e.g., 60) having at least a portion configured to penetrate through a building structure (e.g., 70), a chimney support (e.g., 30) disposed within the pass-through tube (e.g., 60) and supported by the pass-through tube (e.g., 60) from within the pass-through tube, the chimney support (e.g., 30) having a first end configured to be coupled to one of an end of a chimney pipe (e.g., 20) and an end of a chimney pipe component (e.g., adapter 40).

Another exemplary embodiment of the invention can include a pass-through device for a chimney, the pass-through device comprising a pass-through tube (e.g., 60) having at least a portion configured to penetrate through a building structure (e.g., 70), a chimney support (e.g., 30) configured to be coupled to one of an end of a chimney pipe (e.g., 20) and an end of a chimney pipe component (e.g., 40), and means (e.g., 62 or 32 and 62) for supporting the chimney support (e.g., 30) within the pass-through tube (e.g., 60).

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

What is claimed is:

1. A pass-through device for a chimney, the pass-through device comprising:

a pass-through tube; and a chimney support disposed within the pass-through tube;

wherein the chimney support is supported by the pass-through tube from within the pass-through tube;

wherein the pass-through tube comprises an inward interference bead projecting radially inward from an interior surface of the pass-through tube;

wherein the chimney support comprises a chimney support plate;

wherein the chimney support plate is supported by the inward interference bead of the pass-through tube; and wherein the chimney support is entirely supported by interference between the chimney support plate and the inward interference bead of the pass-through tube.

2. A pass-through device for a chimney, the pass-through device comprising:

a pass through tube;

a chimney support disposed within the pass-through tube;

a connector pipe adapter coupled to an end of the chimney support, and a pass-through end cap disposed on an end of the pass-through tube;

wherein the chimney support is supported by the pass-through tube from within the pass-through tube;

wherein the pass-through tube comprises an inward interference bead projecting radially inward from an interior surface of the pass-through tube;

wherein the chimney support comprises a chimney support plate;

wherein the chimney support plate is supported by the inward interference bead of the pass-through tube owing to gravity;

wherein a portion of the connector pipe adapter extends through an opening in the pass-through end cap; and wherein the pass-through end cap does not bear a load from the chimney support and does not bear a load from the connector pipe adapter.

3. The pass-through device of claim 2, wherein the inward interference bead projects radially inward from the interior surface of the pass-through tube by a predetermined depth such that the chimney support plate interfaces with the inward interference bead of the pass-through tube and restricts movement of the chimney support within the pass-through tube.

4. The pass-through device of claim 2, wherein the chimney support is entirely supported by interference between the chimney support plate and the inward interference bead of the pass-through tube.

5. The pass-through device of claim 2, wherein an outer diameter of the chimney support plate abuts an interior diameter of the pass-through tube.

6. The pass-through device of claim 2, wherein the inward interference bead defines a clearance distance at a predetermined location along a length of the pass-through tube, the clearance distance being less than an interior diameter of the pass-through tube in other regions, and wherein an outer diameter of the chimney support plate is greater than the clearance distance.

7. The pass-through device of claim 2, wherein the inward interference bead defines an opening within the pass-through tube, and wherein an outer diameter of the chimney support plate is greater than an inner diameter of the opening defined by the inward interference bead.

8. The pass-through device of claim 2, wherein the inward interference bead projects radially inward from the interior surface of the pass-through tube continuously around a circumference of the interior surface of the pass-through tube.

9. The pass-through device of claim 2, wherein the inward interference bead includes a plurality of bead sections projecting radially inward from the interior surface of the pass-through tube around a circumference of the interior surface of the pass-through tube.

10. The pass-through device of claim 2, wherein the inward interference bead includes a plurality of bead sections projecting radially inward from the interior surface of the pass-through tube intermittently around a circumference of the interior surface of the pass-through tube.

11. The pass-through device of claim 2, wherein the inward interference bead projects radially inward from the interior surface of the pass-through tube without extending continuously around a circumference of the interior surface of the pass-through tube.

12. The pass-through device of claim 2, wherein the inward interference bead is disposed in a middle portion along a length of the pass-through tube.

13. The pass-through device of claim 2, wherein the inward interference bead is spaced a predetermined distance from an end of the pass-through tube.

14. The pass-through device of claim 13, wherein the predetermined distance is equal to or less than about ⅔ of a length of the pass-through tube.

15. The pass-through device of claim 3, wherein the predetermined depth is less than or equal to about 2 inches.

16. The pass-through device of claim 3, wherein the predetermined depth is equal to or greater than about 0.25 inches and less than or equal to about 2 inches.

17. The pass-through device of claim 3, wherein a diameter of the pass-through tube is less than or equal to about 18 inches, and wherein the predetermined depth is equal to or greater than about 0.25 inches and less than or equal to about 2 inches.

18. The pass-through device of claim 1, further comprising:

a connector pipe adapter coupled to an end of the chimney support, wherein an end portion of the connector pipe adapter extends outward from an end of the pass-through tube, and wherein a location of the inward interference bead along a length of the pass-through tube determines a distance that the end portion of the connector pipe adapter extends from the end of the pass-through tube.

19. The pass-through device of claim 1, further comprising:

a pass-through end cap disposed on an end of the pass-through tube, wherein the pass-through end cap is non-load bearing.

20. A chimney support system comprising:

a pass-through tube having at least a portion configured to penetrate through a building structure;

a chimney support disposed within the pass-through tube and supported by the pass-through tube from within the pass-through tube, the chimney support having a first end configured to be coupled to one of an end of a chimney pipe and an end of a chimney pipe component;

a connector pipe adapter including:

a first end coupled to a second end of the chimney support pass-through tube; and a second end extending outward from an end of the pass-through tube and configured to be disposed on an opposite side of the building structure from the chimney pipe; and a non-load bearing pass-through end cap disposed on an end of the pass-through tube, the non-load bearing pass-through end cap configured to be disposed on the opposite side of the building structure from the chimney pipe;

wherein the pass-through tube comprises an inward interference bead projecting radially inward from an interior surface of the pas-through tube;

wherein the chimney support comprises a chimney support plate;

wherein the chimney support plate is supported by the inward interference bead of the pass-through tube; and wherein a location of the inward interference bead along a length of the pass-through tube determines a distance that the second end of the connector pipe adapter extends from the end of the pass-through tube.

21. A chimney support system comprising:

a pass-through ube having at least portion configured to penetrate through a building structure;

a chimney support disposed within the pass-through tube and supported by the pass-through tube from within the pass-tube, the chimney support having a first end configured to be coupled to one of an end of a chimney pipe and an end of a chimney pipe component;

a connector adapter including:

a first end coupled to a second end of the chimney support within the pass-through tube; and a second end extending outward from an end of the pass-through tube and configured to be disposed on an opposite side of the building structure from the chimney pipe; and a pass-through end cap disposed on an end of the pass-through tube, the pass-through end cap configure to be disposed on the opposite side of the building structure from the chimney pipe, wherein the pass-through tube comprises an inward interference bead projecting radially inward from an interior surface of the pass-rough tube;

wherein the chimney support comprises a chimney support plate;

wherein the chimney support plate is supported by the inward interference bead of the pass-through tube;

wherein a location of the inward interreference bead along a length of the pass-through tube determines a distance that thy second end of the connector pipe adapter extends from the end of the pass-through tube; and wherein the pass-through tube end cap does not bear a load from the chimney support and does not bear a load from the connector pipe adapter.

22. The chimney support system of claim 20, further comprising:

a mount bracket configured to secure a position of the pass-through tube with respect to the building structure.

23. The chimney support system of claim 21, further comprising:

a mount bracket configured to secure a position of the pass-through tube with respect to the building structure.

24. A package comprising the chimney support system of claim 20, wherein the chimney support system is arranged in a nested fashion.

25. A package comprising the chimney support system of claim 21, wherein the chimney support system is arranged in a nested fashion.

26. The pass-through device of claim 1, wherein the inward interference bead projects radially inward from the interior surface of the pass-through tube by a predetermined depth such that the chimney support plate interfaces with the inward interference bead of the pass-through tube and restricts movement of the chimney support within the pass-through tube.

27. The pass-through device of claim 1, wherein an outer diameter of the chimney support plate abuts an interior diameter of the pass-through tube.

28. The pass-through device of claim 1, wherein the inward interference bead defines a clearance distance at a predetermined location along a length of the pass-through tube, the clearance distance being less than an interior diameter of the pass-through tube in other regions, and wherein an outer diameter of the chimney support plate is greater than the clearance distance.

29. The pass-through device of claim 1, wherein the inward interference bead defines an opening within the pass-through tube, and wherein an outer diameter of the chimney support plate is greater than an inner diameter of the opening defined by the inward interference bead.

30. The pass-through device of claim 1, wherein the inward interference bead projects radially inward from the interior surface of the pass-through tube continuously around a circumference of the interior surface of the pass-through tube.

31. The pass-through device of claim 1, wherein the inward interference bead includes a plurality of bead sections projecting radially inward from the interior surface of the pass-through tube around a circumference of the interior surface of the pass-through tube.

32. The pass-through device of claim 1, wherein the inward interference bead includes a plurality of bead sections projecting radially inward from the interior surface of the pass-through tube intermittently around a circumference of the interior surface of the pass-through tube.

33. The pass-through device of claim 1, wherein the inward interference bead projects radially inward from the interior surface of the pass-through tube without extending continuously around a circumference of the interior surface of the pass-through tube.

34. The pass-through device of claim 1, wherein the inward interference bead is disposed in a middle portion along a length of the pass-through tube.

35. The pass-through device of claim 1, wherein the inward interference bead is spaced a predetermined distance from an end of the pass-through tube.

36. The pass-through device of claim 35, wherein the predetermined distance is equal to or less than about ⅔ of a length of the pass-through tube.

37. The pass-through device of claim 26, wherein the predetermined depth is less than or equal to about 2 inches.

38. The pass-through device of claim 26, wherein the predetermined depth is equal to or greater than about 0.25 inches and less than or equal to about 2 inches.

39. The pass-through device of claim 26, wherein a diameter of the pass-through tube is less than or equal to about 18 inches, and wherein the predetermined depth is equal to or greater than about 0.25 inches and less than or equal to about 2 inches.

* * * * *